Figure 1:
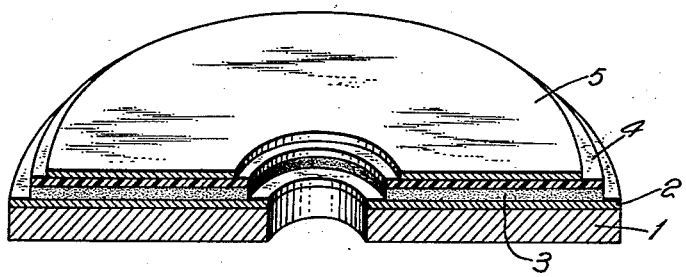

Dec. 3, 1957 P. E. LIGHTY 2,815,475
SELENIUM RECTIFIER
Filed March 5, 1954

INVENTOR
PAUL E. LIGHTY
BY
ATTORNEY

United States Patent Office 2,815,475
Patented Dec. 3, 1957

2,815,475

SELENIUM RECTIFIER

Paul E. Lighty, Lafayette, N. J., assignor to International Telephone and Telegraph Corporation, Nutley, N. J., a corporation of Maryland Application March 5, 1954, Serial No. 414,331

19 Claims. (Cl. 317—241)

This invention relates to improvements in selenium rectifiers and more particularly to the introduction of a novel lacquer as a barrier layer between the selenium and the counter-electrode layers of such rectifiers.

It is believed that the effective rectifying action of dry rectifiers, such as selenium rectifiers, largely depends upon the formation of a so-called barrier layer between the semiconductive material, such as selenium, and the applied counter electrode. This barrier layer may be derived genetically by treatment of the selenium itself or may be formed by applying a nongenetic layer, such as a lacquer, to the selenium surface. The effectiveness of the barrier layer is enchanced by electrically "forming" the rectifier. This forming process comprises applying a voltage to the rectifier in the reverse or poorly conducting direction for a given length of time.

Various chemical and physical treatments of the selenium surface prior to the application of the counter-electrode layer have been proposd in order to form a genetically derived barrier layer on the selenium surface. In addition, several lacquer compositions, containing a wide variety of constituents, have been proposed for use. Some of these have resulted in the production of rectifiers of somewhat improved characteristics. However, it has been found that in many instances selenium rectifiers using these artificial lacquers are unstable, showing undesirable aging properties. That is, with the passage of time, many of these rectifiers show a marked decrease in their forward conductivity with a consequent decrease in their effective rectification ratio. It is believed that part of this undesirable aging effect is due to the inability of these artificial barrier layers to withstand the relatively high operating temperatures of selenium rectifiers. Furthermore, using various of these known lacquers, it is often found that apparent improvements in increasing the reverse resistance of the rectifier can be obtained only at the expense of a marked increase in the forward resistance of the rectifier.

It is an object of the present invention to provide a novel type of lacquer for use as an artificial barrier layer in a rectifier, thereby providing rectifiers having improved forward and reverse characteristics over a longer period of time than rectifiers heretofore known.

A further object of this invention is to provide a new lacquer for use in a rectifier as an artificial barrier layer capable of withstanding high-temperature operation of such rectifiers.

A still further object is to provide a selenium rectifier using such new lacquer barrier layers.

It is still a further object of this invention to provide a novel process for making a selenium rectifier plate.

As a feature of this invention a polymonochlorotrifluoroethylene lacquer is used as an artificial barrier layer for a selenium rectifier.

It is a further important feature of this invention that this polymonochlorotrifluoroethylene lacquer additionally contains an organic amine.

Figure 2:
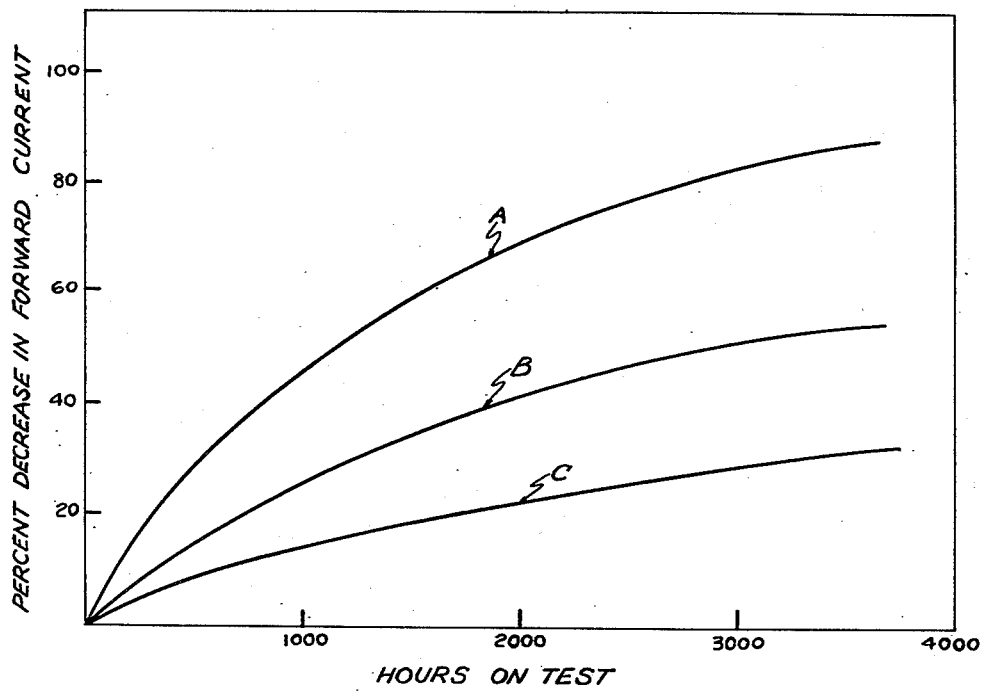

The above-mentioned and other features and objects of this invention and the manner of attaining them will become more apparent and the invention itself will be best understood by reference to the following description of embodiments of the invention taken in conjunction with the accompanying drawings wherein:

Fig. 1 represents a cross section of a selenium rectifier showing one embodiment of the invention; and Fig. 2 represents a graph showing characteristic curves of selenium rectifiers made with standard type lacquers and those made with a lacquer of this invention.

In Fig. 1 the base plate element 1 may consist of any of the various metals used for this purpose; thus, iron, magnesium, aluminum, nickel or bismuth may be used for the purposes of this invention. In general, I prefer to use an aluminum base plate because of its light weight and good heat and electrical conductivity. This base plate is suitably cleaned and etched and then preferably plated with a layer 2 of nickel. Upon this plated base plate is then deposited a layer of highly purified selenium 3 by any of the methods commonly employed. Thus it has been suggested that the base plate be heated above the melting point of selenium and a stick of selenium be rubbed over the surface of the base plate. Another proposal has been to have pellets of selenium melted while on the base plate and then spread thereon. Still another procedure has been to dip the base plate in molten selenium and remove the excess from the base plate by centrifugally spinning the base plate. Vacuum evaporation of selenium has also been employed for deposition of the selenium on the base plate. I have found that while any of these methods may be employed herein, the method consisting of dusting the base plate with powdered selenium and then pressing the selenium onto the surface of the base plate by means of heat and pressure is preferable. Thus, the selenium may be made to adhere satisfactorily to the base plate by sprinkling the powdered selenium upon the cold base plate and then heat treating this plate in a known manner at a temperature between 100° C. and 150° C. while applying pressure thereto. While the selenium may be used in the pure state without the addition of additives, I have found that the addition of various halogens either in the elemental state or as compounds in any of their various salts, such as cerium bromide, selenium iodide, selenium monochloride or the like is useful in improving the conductivity of the selenium in the forward-conducting direction. Also, in various embodiments of this invention, the in situ formation of a selenide layer between the nickel and selenium surface may be useful in improving the desired electrical properties of the finished rectifier.

The selenium is essentially in the amorphous state following its deposition on the base plate, and in order to increase the crystallization of the selenium and convert it thereby to its more conductive variety an annealing step is necessary. While this annealing step may be performed after deposition of a counter-electrode layer upon the free surface of the amorphous selenium, I have found that more satisfactory results are obtained by first annealing the selenium surface. Possibly, this is because crystallization of the selenium may be promoted by the presence of water vapor or other constituents normally present in the atmosphere in which the heat-treating step is performed. Generally speaking this annealing is accomplished by heating the selenium at a temperature above 150° C. in order to accelerate the rate of crystallization. At a temperature of 150° C. several hours of heat treatment for obtaining satisfactory crystallization may be required. Where more elevated temperatures are used, below but close to the melting point of selenium, the time required for conversion of the selenium to its more conductive variety is correspondingly reduced. Thus, a treatment at 210° C. for a half hour is usually sufficient for producing the desired degree of crystallinity.

Following this annealing treatment, the artificial barrier layer 4 that is the subject of this invention is deposited on the selenium layer either by brushing, dipping spraying, centrifugal spinning or the like. This artificial layer consists, in its most general embodiment, of a layer of polymeric chlorotrifluoroethylene. It is preferably deposited from a dispersion of finely divided polymonochlorotrifluoroethylene in a hydrocarbon solvent such as toluene or xylene. A suitable dispersion consisting of polymonochlorotrifluoroethylene of particle size 1–3 microns dispersed in xylene is commercially available under the trade name of Kel–F N–1 grade, sold by the M. W. Kellogg Company. This dispersion is usually available with a solids content of approximately 0.4 kilogram per liter, or approximately 34% solids by weight, and having an apparent viscosity of approximately 100 centipoises at room temperature. However, it may be readily diluted with xylene to lower the viscosity and promote ease in application. The solids content of the polymonochlorotrifluoroethylene is essentially not critical in that a more dilute dispersion merely requires the repeated application of the barrier material until the desired thickness of the barrier layer, as shown by measurements of the reverse conductivity of the selenium rectifier, is obtained. This determination of the amount of barrier layer material to apply is readily made experimentally and is a procedure familiar to those skilled in this art.

While improvements in the reverse resistance of selenium rectifiers treated with this polymonochlorotrifluoroethylene lacquer may be obtained, I have found that the addition of a low-molecular-weight organic amine to the polymonochlorotrifluoroethylene dispersion gives particularly enhanced results. By a low-molecular-weight organic amine, I refer to a substituted amine in which there is a maximum of 15 carbon atoms present, and no single substituent group contains more than 6 carbon atoms. Organic amines that may be used for the foregoing purpose include N-methyldiethanolamine, $$CH_3N(CH_2CH_2OH)_2$$

diethanolamine $(HOCH_2CH_2)_2NH$; triethanolamine, $(HOCH_2CH_2)_3N$; para-phenylenediamine, $$NH_2.C_6H_4.NH_2$$

diisopropylamine $[(CH_3)_2CH]_2NH$; diethylethanolamine, $(C_2H_5)_2NCH_2CH_2OH$; isopropylamine, $(CH_3)_2CHNH_2$; dimethylethanolamine, $(CH_3)_2NCH_2CH_2OH$; monoethanolamine, $HOCH_2CH_2NH_2$; aminoethylethanolamine, $NH_2CH_2CH_2NHCH_2CH_2OH$; diethylenetriamine, $$NH_2CH_2CH_2NHCH_2CH_2NH_2$$

monoisopropanolamine, $CH_3CHOHCH_2NH_2$; tetraethylenepentamine, $NH_2(CH_2CH_2NH)_3CH_2CH_2NH_2$; ethylenediamine, $NH_2CH_2CH_2NH_2$; triethylenetetramine, $NH_2(CH_2CH_2NH)_2CH_2CH_2NH_2$; propylenediamine, $$CH_3CH(NH_2)CH_2NH_2$$

triethylamine $(CH_3CH_2)_3N$; N-aminopropylmorpholine,

N-acetylethanolamine, $CH_3CONHC_2H_4OH$; diisopropanolamine, $(CH_3CHOHCH_2)_2NH$; N-hydroxyethylmorpholine,

triisopropanolamine, $(CH_3CHOHCH_2)_3N$; tri-n-amylamine, $[CH_3(CH_2)_4]_3N$; diethylamine, $(CH_3CH_2)_2NH$. As a preferred method of adding the amine, a dilute solution or dispersion, such as an approximately 1% solution or dispersion by weight of the amine in a suitable inert solvent, such as nitromethane or a mixture of nitromethane and methyl alcohol, is prepared. This solution of the amine is then added to the polymonochlorotrifluoroethylene dispersion, mixed thoroughly, and the resultant dispersion is deposited upon the annealed selenium surface. The relative proportions of the amine and the polymonochlorotrifluoroethylene may be varied widely. A ratio by weight of solvent-free materials of polymonochlorotrifluoroethylene to amine varying from 0.1 to 10 has been found satisfactory. An example of one typical formulation of several suitable embodiments is as follows:

Example I

| | Parts by weight |
|---|---|
| Polymonochlorotrifluoroethylene, 34% by weight solution in xylene (dry weight basis) | 0.1–1 |
| Amine | 0.1–1 |
| Nitromethane | 90–100 |
| Methyl alcohol | 0–5 |

Mixtures of amines that do not chemically react with one another to interfere with the formation of the barrier layer as well as individual amines may be used in preparing the polymonochlorotrifluoroethylene amine-containing lacquer.

Although the above-enumerated amines are preferable for use with polymonochlorotrifluoroethylene for carrying out the objects of this invention, I have found particularly desirable and preferable the addition to polymonochlorotrifluoroethylene of para-phenylenediamine in a nitromethane solvent. Furthermore, wherever nitromethane is used as a solvent, the effectiveness of the barrier layer formed is particularly enhanced by the prior addition to the nitromethane of a small amount of acetaldehyde, for example, less than 1 part of acetaldehyde to 100 parts of nitromethane by weight. Thus, a lacquer composition yielding particularly improved results consists of the following:

Example II

| | | Range |
|---|---|---|
| Polymonochlorotrifluoroethylene | grams | 0.2 to 20 |
| Para-phenylenediamine | do | 0.1 to 10 |
| Nitromethane | milliliters | 10 to 1000 |

The polymonochlorotrifluoroethylene above specified is preferably contained in a xylene solvent in a concentration of approximately 0.4 kilogram per liter. This concentration of the polymonochlorotrifluoroethylene may be adjusted by the addition of xylene to change the viscosity of the dispersion depending upon the mode of application employed. A composition that has been found particularly suitable for application by centrifugal spinning and that has given markedly superior results in forward and reverse conductivity, rapid forming time and resistance to aging is shown in Example III:

Example III

| | |
|---|---|
| Polymonochlorotrifluoroethylene | 2 grams (dry weight) of Kel–F N–1, 0.4 kilogram polymonochlorotrifluoroethylene per liter of xylene. |
| Para-phenylenediamine | 1 gram. |
| Nitromethane | 100 milliliters. |
| Acetaldehyde | 0.1 to 0.5%, based on the weight of nitromethane. |

After centrifugal spinning of the lacquer, a counter-electrode layer 5, consisting for example of cadmium, a cadmium-bismuth alloy, a cadmium-bismuth-tin eutectic, a cadmium-tin alloy, or any of the similar alloys employed for this purpose, is applied to the barrier layer. Various methods of applying the counter-electrode composition, such as a molten-metal spraying, mechanical pressing, cathodic sputtering, electrodeposition, and vacuum evaporation or deposition have been suggested. I have found molten-metal spraying to be suitable for the purposes of this invention. The rectifier is then electrically formed by the passage in the blocking or high resistance direction of alternating current, direct current or pulsating direct current. Any of the well-known conditions of forming such as constant-current, constant-voltage or constant-power forming may be used.

In Fig. 2 is shown a graphical comparison of the percentage decrease in forward current of various groups of selenium rectifiers versus operating time in hours. Curve A shows the life data of selenium rectifiers processed with a tetraethylenepentamine-type lacquer barrier layer. Curve B is obtained from selenium rectifiers using a nitrocellulose-type lacquer barrier layer. Curve C is obtained from selenium rectifiers using a preferred embodiment of the lacquer of this invention, for example as shown in Example III. Although the lacquers in curves A and B are useful ones which yield improved selenium rectifiers compared with those having no barrier layer, it is apparent from reference to the graph that the lacquer of the subject invention gives markedly superior results with respect to aging performance. Thus, it is clearly seen that almost a threefold improvement in aging properties is obtained using the lacquer of this invention.

It will be apparent to those skilled in this art that many modifications may be made in the formulation of the composition of the lacquer of the subject invention without departing from the basic spirit thereof. Thus, various wetting agents may be incorporated in the lacquer formulation to promote more ready wetting of the selenium surface upon experimental determination that no deleterious effects are obtained thereby. It should be observed also that while many methods may be used in applying the lacquer to the selenium layer, as mentioned hereinbefore, it is important that the polymonochlorotrifluoroethylene be maintained in suspension at all times. This may be readily accomplished by the use of conventional continuous agitator devices, or the like.

While I have described above the principles of my invention in connection with specific materials and methods, it is to be clearly understood that this description is made only by way of example and illustration and not as a limitation to the scope of my invention as set forth in the objects thereof and in the accompanying claims.

I claim:

1. A lacquer comprising 0.1 to 1 part of polymonochlorotrifluoroethylene and 0.1 to 1 part of a low-molecular-weight organic amine in a hydrocarbon solvent.

2. A lacquer comprising from 0.1 to 1 part of polymonochlorotrifluoroethylene and from 0.1 to 1 part of a low-molecular-weight organic amine selected from the group consisting of N-methyldiethanolamine, diethanolamine, triethanolamine para-phenylenediamine, diisopropylamine, diethylethanolamine, isopropylamine, dimethylethanolamine, monoethanolamine, aminoethylethanolamine, diethylenetriamine, monoisopropanolamine, tetraethylenepentamine, ethylenediamine, triethylenetetramine, propylenediamine, triethylamine, N-aminopropylmorpholine, N-acetylethanolamine, diisopropanolamine, N-hydroxyethylmorpholine, triisopropanolamine, tri-n-amylamine, and diethylamine in a hydrocarbon solvent.

3. A lacquer comprising 0.1 to 1 part of polymonochlorotrifluoroethylene, 0.1 to 1 part of para-phenylenediamine and 90 to 100 parts of nitromethane in a hydrocarbon solvent.

4. A lacquer comprising about 2 parts of polymonochlorotrifluoroethylene, 1 part of para-phenylenediamine, 100 parts of nitromethane and less than 1 part of acetaldehyde in a hydrocarbon solvent.

5. In a rectifier having a base plate, a layer of selenium on the base plate and a counter-electrode layer on the selenium, an intermediate layer between the selenium and the counter electrode comprising polymonochlorotrifluoroethylene.

6. In a rectifier having a base plate, a layer of selenium on the base plate and a counter-electrode layer on the selenium, an intermediate layer between the selenium and the counter electrode comprising polymonochlorotrifluoroethylene and a low-molecular-weight organic amine.

7. In a rectifier having a base plate, a layer of selenium on the base plate and a counter-electrode layer on the selenium, an intermediate layer between the selenium and the counter electrode comprising polymonochlorotrifluoroethylene and an organic amine selected from the group consisting of N-methyldiethanolamine, diethanolamine, triethanolamine, para-phenylenediamine, diisopropylamine, diethylethanolamine, isopropylamine, dimethylethanolamine, monoethanolamine, aminoethylethanolamine, diethylenetriamine, monoisopropanolamine, tetraethylenepentamine, ethylenediamine, triethylenetetramine, propylenediamine, triethylamine, N-amino-propylmorpholine, N-acetylethanolamine, diisopropanolamine, N-hydroxyethylmorpholine, triisopropanolamine, tri-n-amylamine and diethylamine.

8. In a rectifier having a base plate, a layer of selenium on the base plate and a counter-electrode layer on the selenium, an intermediate layer between the selenium and the counter electrode comprising polymonochlorotrifluoroethylene and para-phenylenediamine.

9. In a rectifier having a base plate, a layer of selenium on the base plate and a counter-electrode layer on the selenium, an intermediate layer between the selenium and the counter electrode comprising about 2 parts by weight of polymonochlorotrifluoroethylene and 1 part by weight of para-phenylenediamine.

10. In a rectifier having a base plate, a layer of selenium on the base plate and a counter-electrode layer on the selenium, an intermediate layer between the selenium and the counter electrode consisting essentially of the end products of the evaporation of a dispersion comprising polymonochlorotrifluoroethylene, a low-molecular-weight organic amine and nitromethane in a hydrocarbon solvent.

11. A rectifier according to claim 10 in which said organic amine is selected from the group consisting of N-methyldiethanolamine, diethanolamine, triethanolamine, para-phenylenediamine, diisopropylamine, diethylethanolamine, isopropylamine, dimethylethanolamine, monoethanolamine, aminoethylethanolamine, diethylenetriamine, monoisopropanolamine, tetraethylenepentamine, ethylenediamine, triethylenetetramine, propylenediamine, triethylamine, N-aminopropylmorpholine, N-acetylethanolamine, diisopropanolamine, N-hydroxyethylmorpholine, triisopropanolamine, tri-n-amylamine and diethylamine.

12. A rectifier according to claim 10 in which said dispersion contains 0.1 to 1 percent acetaldehyde by weight of the nitromethane.

13. A rectifier according to claim 10 in which said organic amine is para-phenylenediamine.

14. A rectifier according to claim 13 in which said dispersion contains 0.1 to 1 percent acetaldehyde by weight of the nitromethane.

15. In a rectifier having a base plate, a layer of selenium on the base plate and a counter-electrode layer on the selenium, an intermediate layer between the selenium and the counter electrode consisting essentially of the end products of the evaporation of a solution consisting essentially of 2 parts by dry weight of polymonochlorotrifluoroethylene in xylene and 1 part by dry weight of para-phenylenediamine and 0.1–1 part by dry weight of acetaldehyde in 100 parts of nitromethane.

16. In the manufacture of selenium rectifier elements in which a selenium layer is applied onto a metallic base, said layer is converted into an electrically conducting state, and a metallic counter electrode applied over such layer, the step of treating the converted layer before the counter electrode is applied with polymonochlorotrifluoroethylene and a low-molecular-weight organic amine in intimate combination.

17. A method according to claim 16 in which said polymonochlorotrifluoroethylene is applied as a dispersion in an aromatic hydrocarbon solvent, said dispersion containing said organic amine in a solvent therefor.

18. A method according to claim 17 in which said aromatic solvent is xylene and said solvent for the organic amine is nitromethane containing less than one percent by weight of acetaldehyde.

19. In the manufacture of selenium rectifier elements in which a selenium layer is applied onto a metallic base, said layer is converted into an electrically conducting state, and a metallic counter electrode applied over said layer, the step of treating the converted layer before the counter electrode is applied with a dispersion of polymonochlorotrifluoroethylene in xylene and para-phenylenediamine in nitromethane in intimate combination, wherein approximately 2 parts by weight of polymonochlorotrifluoroethylene is contained for each part by weight of para-phenylenediamine and wherein said nitromethane contains less than 0.5 percent by weight of acetaldehyde.

References Cited in the file of this patent

UNITED STATES PATENTS

| | | |
|---|---|---|
| 2,393,967 | Brubaker | Feb. 5, 1946 |
| 2,660,697 | Lauckner | Nov. 24, 1953 |